United States Patent
Vigholm et al.

(10) Patent No.: US 11,396,735 B2
(45) Date of Patent: Jul. 26, 2022

(54) METHOD FOR CONTROLLING BRAKE FORCES OF A WORKING MACHINE

(71) Applicant: Volvo Construction Equipment AB, Eskiltuna (SE)

(72) Inventors: Bo Vigholm, Stora Sunby (SE); Andreas Ekvall, Hallstahammar (SE); Erik Carldén, Kvicksund (SE); Kausihan Selvam, Gothenburg (SE); Benny Truong, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 567 days.

(21) Appl. No.: 16/327,081

(22) PCT Filed: Aug. 24, 2016

(86) PCT No.: PCT/SE2016/050790
§ 371 (c)(1),
(2) Date: Feb. 21, 2019

(87) PCT Pub. No.: WO2018/038655
PCT Pub. Date: Mar. 1, 2018

(65) Prior Publication Data
US 2019/0211529 A1 Jul. 11, 2019

(51) Int. Cl.
*B60T 8/17* (2006.01)
*B60T 8/30* (2006.01)
(Continued)

(52) U.S. Cl.
CPC .............. *E02F 9/2083* (2013.01); *B60T 8/17* (2013.01); *B60T 8/171* (2013.01); *B60T 8/172* (2013.01);
(Continued)

(58) Field of Classification Search
CPC ....... E02F 9/2083; E02F 3/283; E02F 9/2253; E02F 9/265; B60T 8/17; B60T 8/171;
(Continued)

(56) References Cited

U.S. PATENT DOCUMENTS 4,553,788 A 11/1985 Smith
4,755,008 A 7/1988 Imoto et al.
(Continued)

FOREIGN PATENT DOCUMENTS

CN 102933438 A 2/2013
EP 0901949 A2 3/1999
(Continued)

OTHER PUBLICATIONS

International Search Report and Written Opinion of the International Searching Authority, PCT/SE/2016/050790, dated Jul. 4, 2017, 17 pages.
(Continued)

*Primary Examiner* — Mathew Franklin Gordon
(74) *Attorney, Agent, or Firm* — Sage Patent Group

(57) ABSTRACT

A method is disclosed for controlling brake forces of a working machine, the working machine including a frame and two front wheels and two rear wheels mounted to the frame, the working machine further including a front wheel brake arranged to brake at least one of the front wheels, and a rear wheel brake arranged to brake at least one of the rear wheels, the front wheel brake being controllable independently of the rear wheel brake, and vice versa, the working machine further including an implement connected to the frame so as to be movable in relation to the frame. The method includes determining a position of the implement in relation to the frame, and distributing the brake forces between the front and rear wheel brakes at least partly based on the determined implement position.

22 Claims, 7 Drawing Sheets

(51) Int. Cl.
- *B62D 12/00* (2006.01)
- *E02F 9/20* (2006.01)
- *B60T 8/1766* (2006.01)
- *B60T 8/1769* (2006.01)
- *B60T 8/26* (2006.01)
- *E02F 9/22* (2006.01)
- *B60T 8/171* (2006.01)
- *B60T 8/172* (2006.01)
- *B60T 8/32* (2006.01)
- *B60T 8/36* (2006.01)
- *E02F 3/28* (2006.01)
- *E02F 9/26* (2006.01)
- *B60T 8/176* (2006.01)

(52) U.S. Cl.
CPC .......... *B60T 8/1766* (2013.01); *B60T 8/1769* (2013.01); *B60T 8/26* (2013.01); *B60T 8/30* (2013.01); *B60T 8/321* (2013.01); *B60T 8/36* (2013.01); *B62D 12/00* (2013.01); *E02F 3/283* (2013.01); *E02F 9/2253* (2013.01); *E02F 9/265* (2013.01); *B60T 8/176* (2013.01); *B60T 2210/12* (2013.01); *B60T 2230/03* (2013.01); *B60T 2240/00* (2013.01); *B60T 2250/00* (2013.01); *B60T 2270/10* (2013.01)

(58) Field of Classification Search
CPC ...... B60T 8/172; B60T 8/1766; B60T 8/1769; B60T 8/26; B60T 8/30; B60T 8/321; B60T 8/36; B60T 8/176; B60T 2210/12; B60T 2230/03; B60T 2240/00; B60T 2250/00; B60T 2270/10; B62D 12/00
See application file for complete search history.

(56) References Cited

U.S. PATENT DOCUMENTS

| | | |
|---|---|---|
| 4,809,586 A | 3/1989 | Gage et al. |
| 5,641,209 A | 6/1997 | Kushi et al. |
| 5,865,512 A | 2/1999 | Meiser et al. |
| 6,880,899 B2 | 4/2005 | Soejima et al. |
| 8,838,357 B2 | 9/2014 | Watanabe |
| 2008/0262682 A1 | 10/2008 | Bergsten |
| 2010/0312436 A1* | 12/2010 | Hartwig ............... B60T 8/1766 701/50 |
| 2012/0152633 A1 | 6/2012 | Tamura et al. |
| 2014/0039767 A1 | 2/2014 | Jensen |
| 2014/0110998 A1 | 4/2014 | Schick et al. |
| 2017/0254047 A1* | 9/2017 | Kortesalmi ............... E02F 3/32 |
| 2019/0031014 A1* | 1/2019 | Yoshizawa ............. B60K 6/445 |
| 2020/0272193 A1* | 8/2020 | Battlogg ................ F16F 9/535 |

FOREIGN PATENT DOCUMENTS

| | | |
|---|---|---|
| EP | 1527970 A2 | 5/2005 |
| JP | 2000344079 A | 12/2000 |

OTHER PUBLICATIONS

International Preliminary Report on Patentability of the International Preliminary Examining Authority, PCT/SE2016/050790, dated Jul. 2, 2018, 18 pages.

Uhlin, E., Unnebäck, J., "On electrification of mass excavation", Conference Proceedings Article, Transportation Electrification Conference and Expo (ITEC) 2013 IEEE, p. 1-6, published Jun. 16, 2013.

Chinese First Office Action dated Jan. 12, 2021 for Chinese Patent Application No. 201680088642.9, 13 pages (including English translation).

European Office Action dated Mar. 4, 2022 for European Patent Application No. 16914326.0, 6 pages.

* cited by examiner

METHOD FOR CONTROLLING BRAKE FORCES OF A WORKING MACHINE

CROSS REFERENCE TO RELATED APPLICATIONS

This application is a 35 U.S.C. § 371 national stage application of PCT Application No. PCT/SE2016/050790 filed on Aug. 24, 2016, the disclosure and content of which are incorporated by reference herein in its entirety.

TECHNICAL FIELD

The invention relates to a method for controlling brake forces of a working machine. The invention also relates to a computer program, a computer readable medium, a control unit, a brake system and a working machine.

The invention is applicable on working machines within the fields of industrial construction machines or construction equipment, in particular wheel loaders. Although the invention will be described with respect to a wheel loader, the invention is not restricted to this particular machine, but may also be used in other working machines such as articulated haulers, excavators and backhoe loaders. The invention can also be applied in heavy-duty vehicles, such as trucks, buses and construction equipment. The invention may also be used in other vehicles such as cars.

BACKGROUND

A working machine, such as a wheel loader, is usually provided with a bucket, container, gripper or other type of implement for digging, carrying and/or transporting a load. For example, a wheel loader has a load arm unit for raising and lowering the implement. Usually a hydraulic cylinder or a pair of hydraulic cylinders is arranged for raising the load arm and a further hydraulic cylinder is arranged for tilting the implement relative to the load arm.

In addition, the working machine is often articulated frame-steered and has a pair of hydraulic cylinders for turning or steering the working machine by pivoting a front frame and a rear frame of the working machine relative to each other. The hydraulic system generally further comprises at least one hydraulic pump, which is arranged to supply hydraulic power, i.e. hydraulic flow and/or hydraulic pressure, to the hydraulic cylinders.

Working machines often operate in harsh environments with uneven support surfaces and quickly changing operational conditions including stopping, starting, loading and unloading at high frequencies. A problem which can occur in working machines is that the rear wheels may at least partially lose contact with the ground during braking. However, in many traditional wheel loaders the rear and front wheels are connected to each other by a propulsion shaft. The brake power provided to the rear wheels may then be transferred to the front wheels through the propulsion shaft, although the rear wheels have partially or fully lost contact with the ground.

However, such brake power transfer may cause parasitic torque in a transmission of the working machine. US2010312436 suggests reducing the brake force on rear wheels to reduce such parasitic torque occurring in the transmission during braking.

Nevertheless, in working machines with electric hub motors for propulsion, there is no such connection to transfer of brake power from the rear wheels to the front wheels. Thus, there's a desire, in particular in hub motor working machines, to provide an improved brake power distribution between front and rear wheels. In particular, there is a desire to improve such a distribution in view of changing operational conditions of the working machine. Preferably, an improved brake power distribution is also provided in a reliable, safe and cost effective manner.

SUMMARY

An object of the invention is to provide, in particular in hub motor working machines, an improved brake power distribution between the working machine wheels. It is also an object of the invention to improve the brake power distribution between the working machine wheels in view of changing operational conditions of the working machine. A further object of the invention is to provide an improved brake power distribution in a reliable, safe and cost effective manner.

The objects are achieved by a method according to claim 1. Thus, the invention provides a method for controlling brake forces of a working machine, the working machine comprising a frame and two front wheels and two rear wheels mounted to the frame, the working machine further comprising a front wheel brake arranged to brake at least one of the front wheels, and a rear wheel brake arranged to brake at least one of the rear wheels, the front wheel brake being controllable independently of the rear wheel brake, and vice versa, the working machine further comprising an implement connected to the frame so as to be movable in relation to the frame, characterized by determining a position of the implement in relation to the frame, and distributing the brake forces between the front and rear wheel brakes at least partly based on the determined implement position.

The invention may provide for calculating a distribution of desired brake forces between the front and rear wheel brakes in dependence on the determined implement position. The brake forces may be distributed between the front and rear wheel brakes in dependence on the determined implement position. In preferred embodiments, also the mass of the implement is taken into account for the brake force distribution determination. The invention may further provide for actuating the brakes in dependence on the brake force distribution calculation. Thus, the brake force distribution may be effectuated in dependence on the determined implement position. This may improve in an advantageous manner the brake power distribution between the working machine wheels. Taking the implement position into consideration will make it possible to greatly improve the precision of the brake power distribution. In hub motor working machines where no propulsion shaft is provided to transfer brake power from rear to front wheels, an improved precision in the brake power distribution provided by the invention will be particularly beneficial.

Determining the position of the implement may comprise determining the height of the implement in relation to the frame. Determining the position of the implement may in addition or alternatively comprise determining the location of the implement in relation to the frame in a longitudinal direction of the working machine. The front wheels may define a front wheel axis and the rear wheels may define a rear wheel axis. The longitudinal direction of the working machine may be understood as defined by a straight line intersecting a point along the front wheel axis, midway between the two front wheels, and intersecting a point along the rear wheel axis, midway between the two rear wheels. Thus, when the working machine is not turning, the longitudinal direction is parallel to a direction of straight travel of the working machine, i.e. a direction in which the working machine may move when not turning. Where the working machine is supported on a horizontal supporting element, the method may comprise determining the location of the implement in relation to the frame in a horizontal direction. A changed position of the implement, e.g. from a low position to a high position, may be a change of the operation condition of the working machine which has a major impact on the control of the working machine. The invention makes it possible to take the changed implement position into consideration to thereby improve the brake power distribution.

As exemplified below, the brake force distribution may be controlled by a control unit of the working machine. The information regarding the implement positon may be provided to the control unit in a simple, reliable and cost effective way. For example, where the implement is connected to the frame via a load arm which is pivotably connected to the frame, determining the position of the implement may comprise determining an angle of the load arm in relation to the frame. Such an angle determination may be provided by a simple and cost effective sensor.

In some embodiments, where the implement is connected to the frame via a load arm, the method may comprise determining a position of the load arm in relation to the frame, and distributing the brake forces between the front and rear wheel brakes partly based on the determined load arm position. Thereby, the mass and the position of the load arm may be taken into consideration for the brake force distribution determination. It should be noted that the load arm may be provided in a variety of manners, e.g. as a single boom, or as two or more booms which may be connected.

The invention may be implemented on a multitude of different working machine types. It is understood that the front and rear wheels may be arranged along a front wheel axis and a rear wheel axis, respectively. At least two wheels may be arranged along each of said wheel axes. There may be more than two front wheels and/or more than two rear wheels. The working machine may also present one or more additional wheel axes. All of, or less than all of the front wheels may be provided with a wheel brake. In some embodiments, where there is more than one front wheel brake, the front wheel brakes may be controllable by a common brake conduit. In other embodiments the front wheel brakes may be controllable individually of each other. Similarly, all of, or less than all of the rear wheels may be provided with a wheel brake. In some embodiments, where there is more than one rear wheel brake, the rear wheel brakes may be controllable by a common brake conduit. In other embodiments the rear wheel brakes may be controllable individually of each other.

It should be noted that the wheel brakes may be provided in a variety of forms. E.g. they may be disc or drum brakes at the respective wheel. In some embodiments, where the working machine is provided with electric propulsion presenting separate propulsion units for the front and rear wheels, such as hub motors, regenerative braking may form at least a part of the function of the wheel brakes. In such regenerative braking, the propulsion units work as generators. Thereby, the brake force distribution control may involve control of the propulsion units so as to distribute selectively the regenerative brake power between the propulsion units. The function of the wheel brakes may also be provided at least partly by some other arrangement in the working machine, e.g. in the drivetrain thereof.

Preferably, the method comprises determining a load of the implement, and distributing the brake forces between the front and rear wheel brakes partly based on the determined load of the implement. Determining the implement load may comprise determining the implement load mass, i.e. the mass of the load carried by the implement. Thus, in addition to the position of the implement, and preferably the mass of the implement, the load carried by the implement may be taken into consideration for the distribution of the brake forces between the front and rear wheel brakes. Thereby, the precision of the brake force distribution may be improved further. Determining the load of the implement may comprise determining the position of the load carried by the implement, e.g. the position of the center of gravity of the load, in relation to the implement.

In advantageous embodiments, the method includes determining a friction coefficient between the rear wheels and an element supporting the working machine, determining a normal force acting on the rear wheels, and distributing the brake forces between the front and rear wheel brakes based partly on the determined friction coefficient and normal force. Thereby, the method may comprise determining a velocity of the working machine, and determining a rotational velocity of at least one of the rear wheels, wherein determining the friction coefficient comprises determining the friction coefficient based at least partly on the determined working machine velocity and the determined rear wheel rotational velocity. The friction coefficient may be determined based on, in addition to the determined working machine and rear wheel rotational velocities, the normal force of the wheel, a torque applied by a hub motor at the wheel, and/or an angle between front and rear frames of the working machine. An example of a determination of the friction coefficient is provided below with reference to the drawings.

A maximum rear wheel brake force may be determined based at least partly on the determined friction coefficient and normal force, and the brake forces may be distributed between the front and rear wheel brakes based partly on the determined maximum rear wheel brake force. A demanded rear wheel brake force may be determined, wherein distributing the brake forces between the front and rear wheel brakes comprises increasing the front wheel brake force if the determined demanded rear wheel brake force is higher than the determined maximum rear wheel brake force. Thereby, a difference between the determined demanded rear wheel brake force and the determined maximum rear wheel brake force may be determined, wherein increasing the front wheel brake force comprises increasing the front wheel brake force by the difference between the determined demanded rear wheel brake force and the determined maximum rear wheel brake force.

Thereby, advantageous embodiments are provided for distributing the brake forces, taking the friction coefficient between the rear wheels and the element supporting the working machine into account. Determining the friction coefficient according to embodiments of the invention provides for adapting the brake force distribution to various conditions such as the nature of the supporting element, or the quality or the degree of wear of tires of the wheels. This provides an increased accuracy in the brake power distribution.

Distributing the brake forces between the front and rear wheel brakes based partly on the determined maximum rear wheel brake force provides for an improved operability of brakes of the working machine. For example, if the supporting element is very uneven, the rear wheel might bump up and down and repeatedly lose contact with the supporting element. Since embodiments of the invention may distribute all brakes forces to the front wheels if the rear wheels lose contact with the supporting element, i.e. if the maximum rear wheel brake force is zero, locking the rear wheels when they are above the supporting element will be avoided. Thereby, rear wheel to ground slipping will be avoided, which will reduce the wear of the tires of the rear wheels.

It should be noted that the method may in addition or alternatively comprise determining a friction coefficient between the front wheels and an element supporting the working machine, determining a normal force acting on the front wheels, and distributing the brake forces between the front and rear wheel brakes based partly on the determined friction coefficient and normal force. Thereby, a velocity of the working machine and a rotational velocity of at least one of the front wheels may be determined, wherein determining the friction coefficient comprises determining the friction coefficient based at least partly on the determined working machine velocity and the determined front wheel rotational velocity. A maximum front wheel brake force may be determined based at least partly on the determined friction coefficient and normal force, and the brake forces may be distributed between the front and rear wheel brakes based partly on the determined maximum front wheel brake force. A demanded front wheel brake force may be determined, wherein distributing the brake forces between the front and rear wheel brakes may comprise increasing the rear wheel brake force if the determined demanded front wheel brake force is higher than the determined maximum front wheel brake force. A difference between the determined demanded front wheel brake force and the determined maximum front wheel brake force may be determined, wherein increasing the rear wheel brake force may comprise increasing the rear wheel brake force by the difference between the determined demanded front wheel brake force and the determined maximum front wheel brake force.

Distributing the brake forces between the front and rear wheel brakes based partly on the determined front wheel to supporting element friction coefficient and the front wheel normal force may be advantageous is certain operational situations of the working machine where the normal forces of the front wheels is smaller than the normal forces on the rear wheels.

In some embodiments, the method comprises determining a normal force acting on the front wheels, determining a normal force acting on the rear wheels, and controlling the brake force distribution between the front and rear wheel brakes so as to obtain the same ratio of the respective brake force and the respective normal force on the front and rear wheels. I.e. the brake force distribution between the front and rear wheel brakes may be controlled so as to obtain $Ff/Nf=Fr/Nr$, where Ff is the brake force on the front wheels, Nf is the normal force on the front wheels, Fr is the brake force on the rear wheels, and Nr is the normal force on the rear wheels. Thereby, an optimal brake force distribution may be provided. The normal forces may be calculated as exemplified below.

It should be noted that the distribution of brake forces between the front and rear wheels, e.g. the increase of the front or rear wheel brake force, may be controlled in a variety of suitable manners. For example, said distribution may be controlled by a brake system including a "brake by wire" function. Such a function could include a control unit being arranged to receive signals from a control device arranged to be manipulated by a driver of the working machine, and to control individually electric actuators for respective brake valves for the front and rear wheels, respectively. In other embodiments, the distribution of brake forces between the front and rear wheels may be controlled by a brake system with pilot conduit control assembly as described below.

Where the frame of the working machine comprises a rear frame to which the rear wheels are mounted and a front frame to which the front wheels are mounted, the front and rear frames being pivotably connected to each other to provide an articulated steering capacity to the working machine, the method may comprise determining an angle between the front and rear frames, and distributing the brake forces between the front and rear wheel brakes based partly on said determined angle. Thereby, the precision of the brake force distribution may be improved further, as exemplified below. It is understood that the angle between the front and rear frames may provide a steering angle of the working machine. It is also understood that determining as described above the position of the implement in relation to the frame may comprise determining the position of the implement in relation to the front frame.

Embodiments of the invention may comprise determining an acceleration, a pitching angle and/or a pitching velocity of the working machine, and distributing the brake forces between the front and rear wheel brakes partly based on the determined acceleration, pitching angle and/or a pitching velocity of the working machine. Thereby, an increased accuracy of the brake force distribution may be provided. The pitching angle of the working machine may be understood as an angle between the longitudinal direction of the working machine and a horizontal plane, and the pitch velocity may be understood as a rate of change of the pitching angle.

Where the frame of the working machine comprises a rear frame to which the rear wheels are mounted and a front frame to which the front wheels are mounted, the front and rear frames being pivotably connected to each other to provide an articulated steering capacity to the working machine, the method may comprise determining an acceleration, a pitching angle and/or a pitching velocity of the rear frame, and distributing the brake forces between the front and rear wheel brakes partly based on the determined acceleration, pitching angle and/or a pitching velocity of the rear frame. The pitching angle of the rear frame may be understood as an angle indicative of the orientation of the rear frame around an axis which is parallel to a rear wheel axis formed by the rear wheels. The pitch velocity of the rear frame may be understood as a rotational velocity of the rear frame around an axis which is parallel to the rear wheel axis. Where the implement is mounted to the front frame, and the distribution of brake forces are dependent on forces acting on the rear wheels, in view of the articulated steering, the determined acceleration, a pitching angle and/or a pitching velocity of the rear frame may provide an increased accuracy of the brake force distribution.

The object are also reached with a computer program according to claim 17, and a computer readable medium according to claim 18. The object are also reached with a control unit configured to control brake forces of a working machine, the working machine comprising a frame and two front wheels and two rear wheels mounted to the frame, the working machine further comprising a front wheel brake arranged to brake at least one of the front wheels, and a rear wheel brake arranged to brake at least one of the rear wheels, the front wheel brake being controllable independently of the rear wheel brake, and vice versa, the working machine further comprising an implement connected to the frame so as to be movable in relation to the frame, characterized in that the control unit is arranged to determine a position of the implement in relation to the frame, and to calculate a distribution of the brake forces between the front and rear wheel brakes at least partly based on the determined implement position.

The objects are also reached with a brake system for a working machine, comprising two front wheel brakes and two rear wheel brakes, the front wheel brakes being controllable independently of the rear wheel brakes, and vice versa, characterized in that the brake system further comprises implement positioning means for determining a position of an implement of the working machine in relation to a frame of the working machine, the brake system further comprising a control unit as described above.

The objects are also reached with a brake system for a working machine, comprising a front wheel brake arranged to brake at least one of two front wheels of the working machine, a hydraulic pressure source arranged to pressurize a hydraulic fluid of the system, a front brake valve, movable between a closed position and an open position and arranged to communicate with the hydraulic pressure source, and a front brake conduit connecting the front brake valve with the front wheel brake, characterized in that the system comprises a front brake pilot conduit arranged to communicate with the front brake conduit and to be pressurized so as to bias the front brake valve towards the closed position, and a pilot conduit control assembly arranged to control the pressure in the front brake pilot conduit.

It is understood that the front brake pilot conduit may be arranged to be pressurized by the pressure in the front brake conduit so as to bias the front brake valve towards the closed position. Thus, the brake system may provide the front brake pilot conduit extending from the front brake conduit and being arranged so as to bias the front brake valve towards the closed position, e.g. via a hydraulic actuator. The pilot conduit draining conduit may extend between the front brake pilot conduit and a reservoir, which may be provided as one or more hydraulic tanks, etc.

A control device, such as a driver's brake pedal, may be arranged to bias the front brake valve towards the open position. The resulting increased pressure in the front brake conduit provides an increased pressure in the front brake pilot conduit, biasing the front brake valve towards the closed position. As exemplified below, by the pilot conduit control assembly it is possible to decrease the pressure in the front brake pilot conduit so that the biasing force acting on the front brake valve is reduced. As a result, without changing the force from the control device, the front brake control valve is urged towards the open position whereby the pressure in the front brake conduit increases.

Thus, the pilot conduit control assembly provides for increasing the pressure in the front brake conduit, and thereby the front brake force, without affecting the force acting on the control device. Thereby, in view of a changing operational condition for the working machine, such as a changed implement position or a changed implement load, the pilot conduit control assembly may change the pressure in the front brake pilot conduit, so that the retardation of the working machine is kept the same in response to a certain actuation force of the control device.

Thereby, an improved brake power distribution between the working machine wheels in view of changing operational conditions of the working machine may be provided. In addition, this improvement may be provided in a reliable, safe and cost effective manner. For example, should the pilot conduit control assembly fail, the pressure in the front brake conduit will in no case be lower than that given with no reduction of the front brake pilot conduit pressure. In such a case the driver may have to compensate for a changed operational condition with adding additional force to the control device, but this may still provide a safe operation in the fault situation.

It is understood that the front brake valve may of any suitable type, e.g. a proportional valve.

Where the system is arranged to provide the hydraulic fluid to be pressurized by the hydraulic pressure source from a reservoir, the pilot conduit control assembly may be arranged to provide a communication between the front brake pilot conduit and the reservoir, and a draining valve may be arranged to control the communication between the front brake pilot conduit and the reservoir. Thereby, the draining valve may form a part of the pilot conduit control assembly, and allow the latter to be controlled in a simple and robust manner by valve control.

Preferably, the communication between the front brake pilot conduit and the reservoir is provided by a pilot conduit draining conduit extending between the front brake pilot conduit and the reservoir, the front brake pilot conduit being provided with a strangulation between the front brake conduit and the pilot conduit draining conduit. The strangulation may provide for a pressure difference across the strangulation so as to maintain a pressure in the front brake pilot circuit which is lower than the pressure in the front brake conduit. The strangulation may be provided in the front brake pilot conduit, between the front brake conduit and a junction between the front brake pilot conduit and the pilot conduit draining conduit. The strangulation may be provided e.g. as a permanently narrowed section of the front brake pilot conduit, or a valve in the front brake pilot conduit arranged to provide several degrees of flow restriction.

It is understood that the strangulation being located between the front brake conduit and the pilot conduit draining conduit does not require that the strangulation is spatially located between the front brake conduit and the pilot conduit draining conduit. The strangulation may simply be functionally located between the front brake conduit and the pilot conduit draining conduit.

Preferably, where the communication between the front brake pilot conduit and the reservoir is provided by a pilot conduit draining conduit extending between the front brake pilot conduit and the reservoir, and a pilot pressure determining device is arranged to determine the pressure in the pilot conduit draining conduit, a safety strangulation is provided between the pilot pressure determining device and the reservoir. The pilot pressure determining device may be at least partly located in the pilot conduit draining conduit. Preferably, the safety strangulation is provided between the draining valve and the reservoir. Thereby, if the draining valve should fail so as to be more open than requested, or completely open without a corresponding request, the pressure in the front brake pilot conduit may be kept above the pressure in the reservoir. As a result, excessive opening of the front brake valve may be avoided, allowing a reduced pressure limit in the front wheel brake design.

The pilot conduit control assembly may be arranged to be controlled by a control unit. For example, where the pilot conduit control assembly comprises a draining valve as exemplified above, the draining valve may be an electrically controlled valve, and arranged to be controlled by the control unit. The control unit may be arranged to control the pilot conduit control assembly based on e.g. the position of an implement of the working machine, as exemplified above.

In advantageous embodiments, where the system comprises a rear wheel brake arranged to brake at least one of two rear wheels of the working machine, where the system comprises a rear brake valve, movable between a closed position and an open position and arranged to communicate with the hydraulic pressure source, and where the system comprises a rear brake conduit connecting the rear brake valve with the rear wheel brake, the system also comprises a rear valve biasing assembly arranged to bias the rear brake valve towards the closed position in dependence on the control of the pressure in the front brake pilot conduit.

Thus, the rear valve biasing assembly may be arranged to bias the rear brake valve towards the closed position in dependence on the control by the pilot conduit control assembly of the pressure in the front brake pilot conduit. Thereby, the pilot conduit control assembly maybe be used to adjust the rear brake valve by the control of the pressure in the front brake pilot conduit. For example, the pilot conduit control assembly may be arranged to bias the rear brake valve towards the closed position in dependence on the position of the draining valve described above. Thus, the pilot conduit control assembly may be used to change the rear brake conduit pressure as well as the front brake conduit pressure. Thereby, a redistribution of brake forces involving changes in front and rear brake conduit pressures may be provided by a simple and robust solution.

Preferably, the rear valve biasing assembly comprises a biasing hydraulic actuator. The biasing hydraulic actuator may be arranged to communicate with the front brake pilot conduit so as for the pressure in the front brake pilot conduit to bias the rear brake valve towards the open position. Thereby, a decrease in the front brake pilot conduit by control of the pilot conduit control assembly as described above, may provide a decrease in the biasing of the rear brake valve towards the open position, so as to allow the rear brake valve to move towards the closed position. Thus, the pressure reduction in the front brake pilot conduit may in addition to providing an increase of the front brake conduit pressure as described above, provide a decrease of the rear brake conduit pressure.

The biasing hydraulic actuator may comprise an elastic element arranged to bias the rear brake valve towards the closed position. Thereby, the rear brake valve may be biased towards the closed position if the biasing hydraulic actuator is not subjected to any hydraulic pressure.

Preferably, the biasing hydraulic actuator is arranged to communicate with the front brake conduit so as for the pressure in the front brake conduit to bias the rear brake valve towards the closed position. Thereby, as the front brake conduit pressure is increased as described above, the pressure in the rear brake conduit may be decreased.

The system preferably comprises a rear brake pilot conduit arranged to communicate with the rear brake conduit and to be pressurized so as to bias the rear brake valve towards the closed position. Thereby, as the rear brake valve is moved towards the open position, e.g. by an actuation force from a control device manipulated by a driver, the resulting increased pressure in the rear brake conduit will provide a counteracting force via the rear brake pilot conduit, which may balance the actuation force so as for the rear brake valve to stay fixed in a positon between a fully open and a fully closed position.

Implement positioning means may advantageously be provided for determining a position of an implement of the working machine in relation to a frame of the working machine, a control unit being arranged to receive signals from the implement positioning means and to control the pilot conduit control assembly at least partly based on the signals from the implement positioning means. Thereby, the beneficial implement position based brake force distribution described above, may be implemented by the simple and robust solution with the pilot conduit control assembly.

The objects are also reached with a working machine comprising a control unit according to any embodiment described or claimed herein, or a brake system according to any embodiment described or claimed herein. The working machine may comprise a propulsion system arranged to provide a torque to at least one of the rear wheels and a torque to at least one of the front wheels, wherein the rear wheel torque can be controlled independently of the front wheel torque and vice versa. For example, the propulsion system may comprise a hub motor at the at least one of the rear wheels and a hub motor at the at least one of the front wheels. As also suggested above, the inventive brake force distribution capacity of embodiments of the invention may be particularly beneficial in working machines with such independent torque distribution capacities.

The working machine may comprise a frame and an implement connected to the frame via a load arm which is pivotably connected to the frame, whereby the load arm is arranged to pivot around an axis which is substantially horizontal when the working machine is supported by a horizontal supporting element. The implement may be pivotably connected to the load arm. As exemplified elsewhere herein, embodiments of the invention may advantageously take the implement position into account for a determination of a distribution of brake forces between the rear and front wheels.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
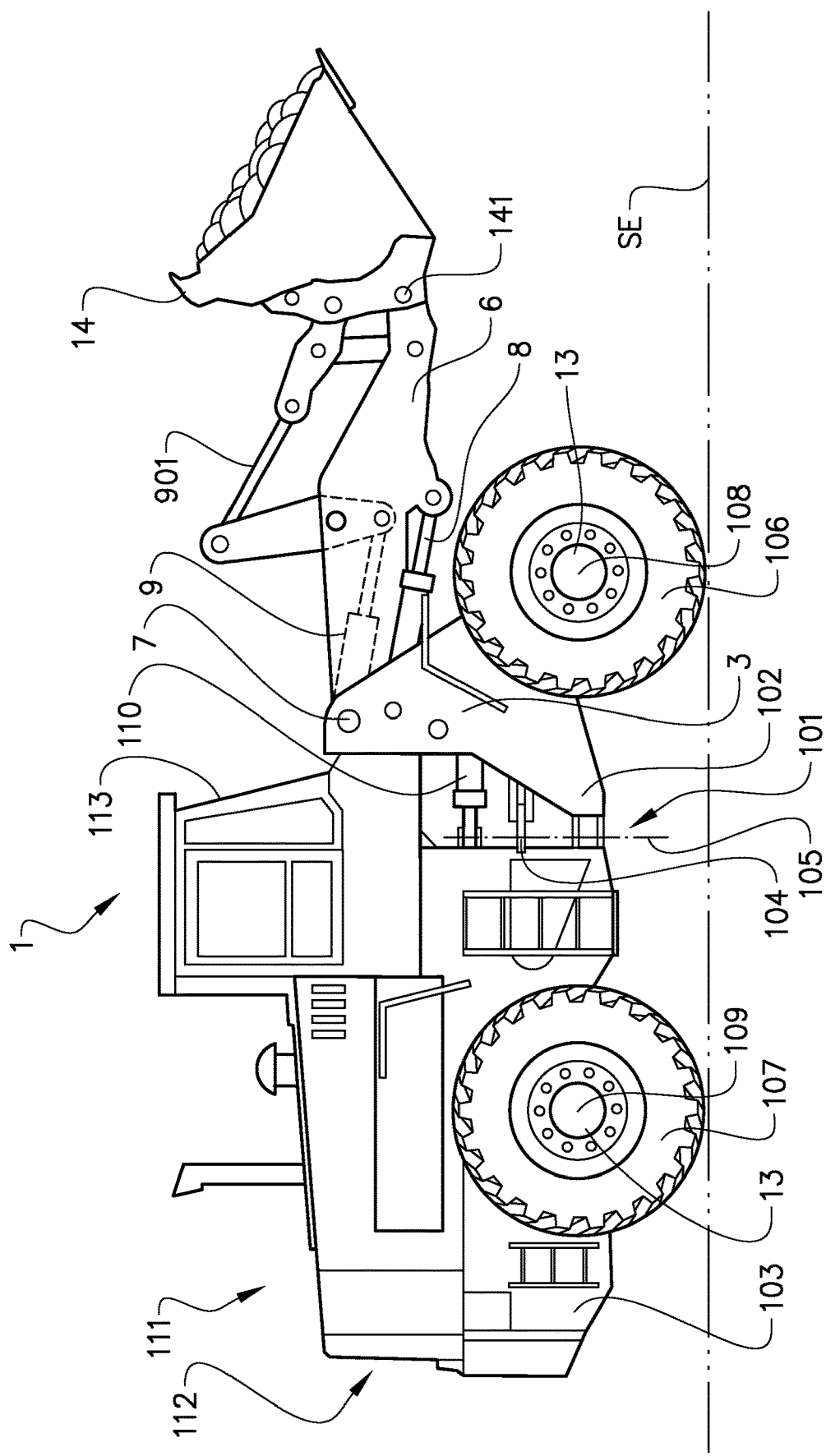
FIG. 1 is a side view of a wheel loader.

FIG. 1 is an illustration of a working machine 1 in the form of a wheel loader. The wheel loader comprises a frame 101 with a front frame 102 and a rear frame 103. The front frame 102 and the rear frame 103 are mounted to each other via a pivotable coupling 104.

The front frame 102 and the rear frame 103 present two front wheels 106 and two rear wheels 107, respectively. The wheels are mounted to respective hub units 13. The front wheels 106 define a front wheel axis 108 and the rear wheels 107 define a rear wheel axis 109.

The pivotable coupling 104 is arranged to allow the front and rear frames to pivot in relation to each other around a pivot axis 105 which is substantially vertical when the wheel loader 1 is supported on a horizontal support element SE. Thereby, an articulated steering capacity is provided to the working machine 1. Two steering hydraulic cylinders 110 are arranged on opposite sides of the wheel loader 1 for turning the wheel loader by means of relative movement of the front frame 102 and the rear frame 103. In other words, the wheel loader 1 is articulated and frame steered by means of the steering hydraulic cylinders 110.

The rear frame 103 of the wheel loader 1 comprises an engine compartment 111 with an internal combustion engine and a radiator system 112. The rear frame 103 further comprises a driver compartment 113, herein also referred to as a cab.

The wheel loader 1 comprises an implement 14. The term "implement" is intended to comprise any kind of tool suitable for a wheel loader, such as a bucket, a fork or a gripping tool. The implement 14 illustrated in FIG. 1 is a bucket. The implement 14 is arranged on an elongated load arm 6 for lifting and lowering the implement 14 relative to the frame 101.

The load arm 6 is at a first end rotatably or pivotably connected to the frame 3 at a first pivot connection 7. The implement 14 is mounted to the load arm 6 at a second pivot connection 141 at a second end of the load arm 6. The load arm 6 is arranged to be pivoted around the first pivot connection 7 by means of a main hydraulic cylinder 8 being part of a hydraulic system of the wheel loader. Thereby the load arm 6 is pivotable between an upper end position and a lower end position, around an axis which is substantially horizontal when the working machine is supported by a horizontal supporting element SE.

The wheel loader also comprises a tilting hydraulic cylinder 9 arranged to actuate a tilting movement of the implement 14 in relation to the load arm 6. For this the implement 14 is pivotally mounted to the load arm 6 at the second pivot connection 141. The tilting hydraulic cylinder 9 extends from the load arm 6 to a linkage mechanism 901, which is adapted to transfer movements from the tilting hydraulic cylinder 9 to the implement 14.

Figure 2:
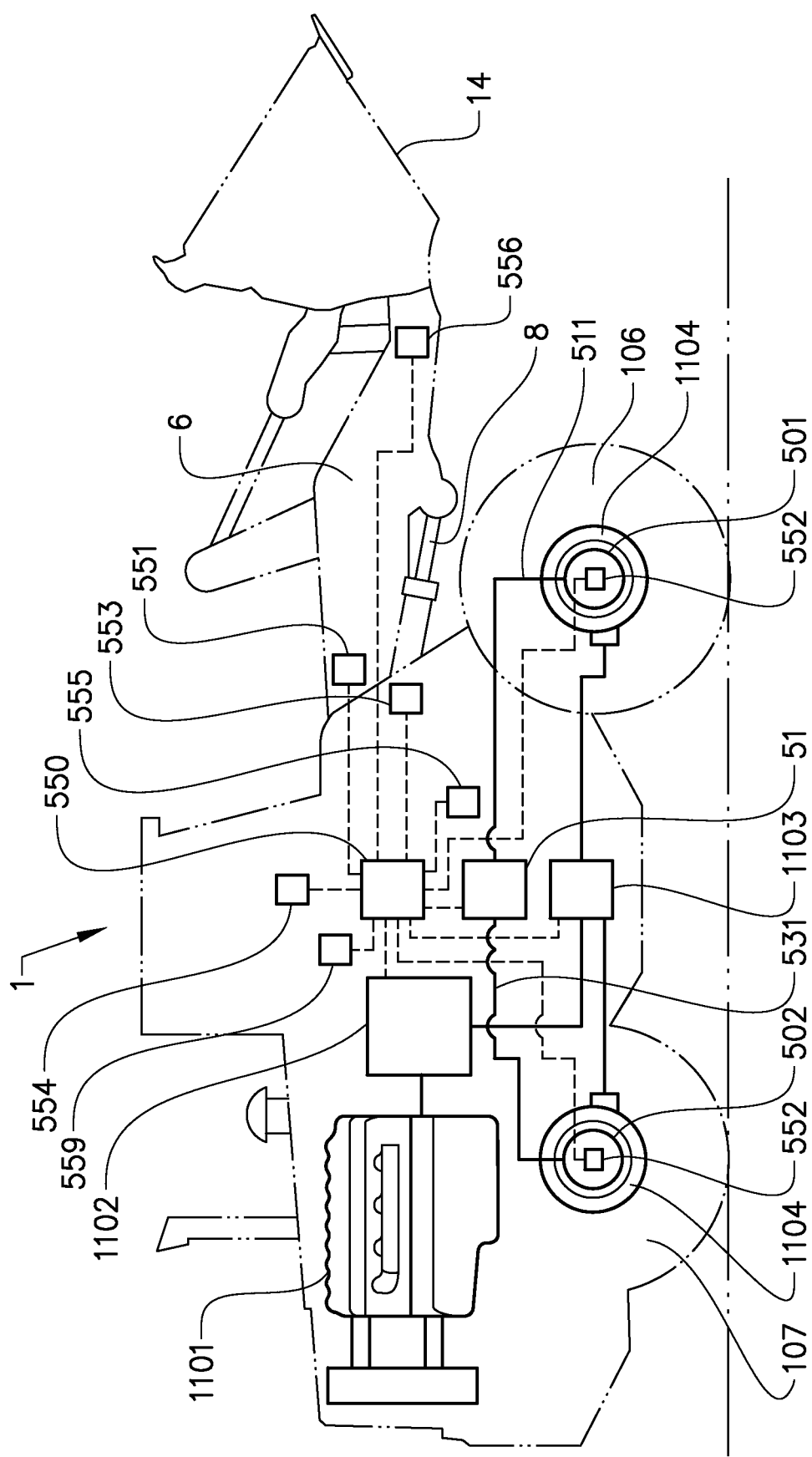
FIG. 2 is a side view of the wheel loader in FIG. 1, depicting components therein.

Reference is made to FIG. 2. The wheel loader 1 has an electric hybrid propulsion system. More specifically, the propulsion system is provided in a series electric hybrid configuration. The internal combustion engine 1101 is connected to a generator 1102, in turn connected to an electric storage arrangement in the form of a power control assembly 1103 including a battery pack. The power control assembly is arranged to be controlled by a control unit 550. At each wheel 106, 107 an electric propulsion motor 1104, herein also referred to as a hub motor, arranged to be powered by the power control assembly 1103 is provided in the respective hub unit 13. Thus, the propulsion system is arranged to provide a torque to the rear wheels 107 and a torque to the front wheels 106, wherein the rear wheel torque can be controlled independently of the front wheel torque and vice versa. In addition, the torque of any wheel can be controlled independently of the torque of any of the other wheels.

It should be noted that the invention is applicable to working machines with other types of propulsion systems, e.g. fully electric propulsion systems, or traditional internal combustion engine and drivetrain combinations.

The wheel loader comprises a brake system comprising a hydraulic control arrangement 51 arranged to be controlled by the control unit 550 as described closer below. The brake system further comprises two front wheel brakes 501, each provided in a respective of the hub units 13 of the front wheels 106, and two rear wheel brakes 502, each provided in a respective of the hub units 13 of the rear wheels 107. A front brake conduit 511 connects the control arrangement 51 with the front wheel brakes 501. A rear brake conduit 531 connects the control arrangement 51 with the rear wheel brakes 502.

The brake system comprises implement positioning means in the form of an angular sensor 551 for determining the angle between the load arm 6 and the front frame 102. The control unit 550 is arranged to receive signals from the implement positioning means 551. Thereby, the angle of the load arm 6 in relation to the frame 101, more particularly the front frame 102, may be determined so that the position of the implement 14 in relation to the frame 101 may be determined.

The control unit 550 is arranged to receive signals from a wheel speed sensor 552 at each wheel 106, 107 for determining the rotational velocity of the respective wheel. The control unit is also arranged to determine the torque provided by each of the hub motors 1104. The control unit is further arrange to receive signals from a load sensor 553 in the form of a pressure sensor at the main hydraulic cylinder 8 for determining the load of the implement 14. Determining the load of the implement may comprise determining the mass of the load carried by the implement; such a load may be referred to as a payload, and may be constituted by gravel, rocks, or some other material suitably handled by the wheel loader. The control unit 550 is also arranged to determine or access a position of the center of gravity of the load carried by the implement; this position may predetermined based on the geometry of the implement.

The control unit 550 is also arranged to receive signals from a movement detection device 554 in the form of an Inertial Measurement Unit (IMU) to determine the acceleration and the pitch angle of the working machine 1. The movement detection device 554 is mounted in the rear frame 103. The control unit is further arranged to receive signals from a frame positioning device 555 to determine the angle between the front and rear frames 102, 103. The control unit is also arranged to receive signals from tilt positioning means 556 in the form of an angular sensor to determine the angle between the load arm 6 and the implement. The control unit 550 is also arranged to access a digital data storage device 559.

Figure 3:
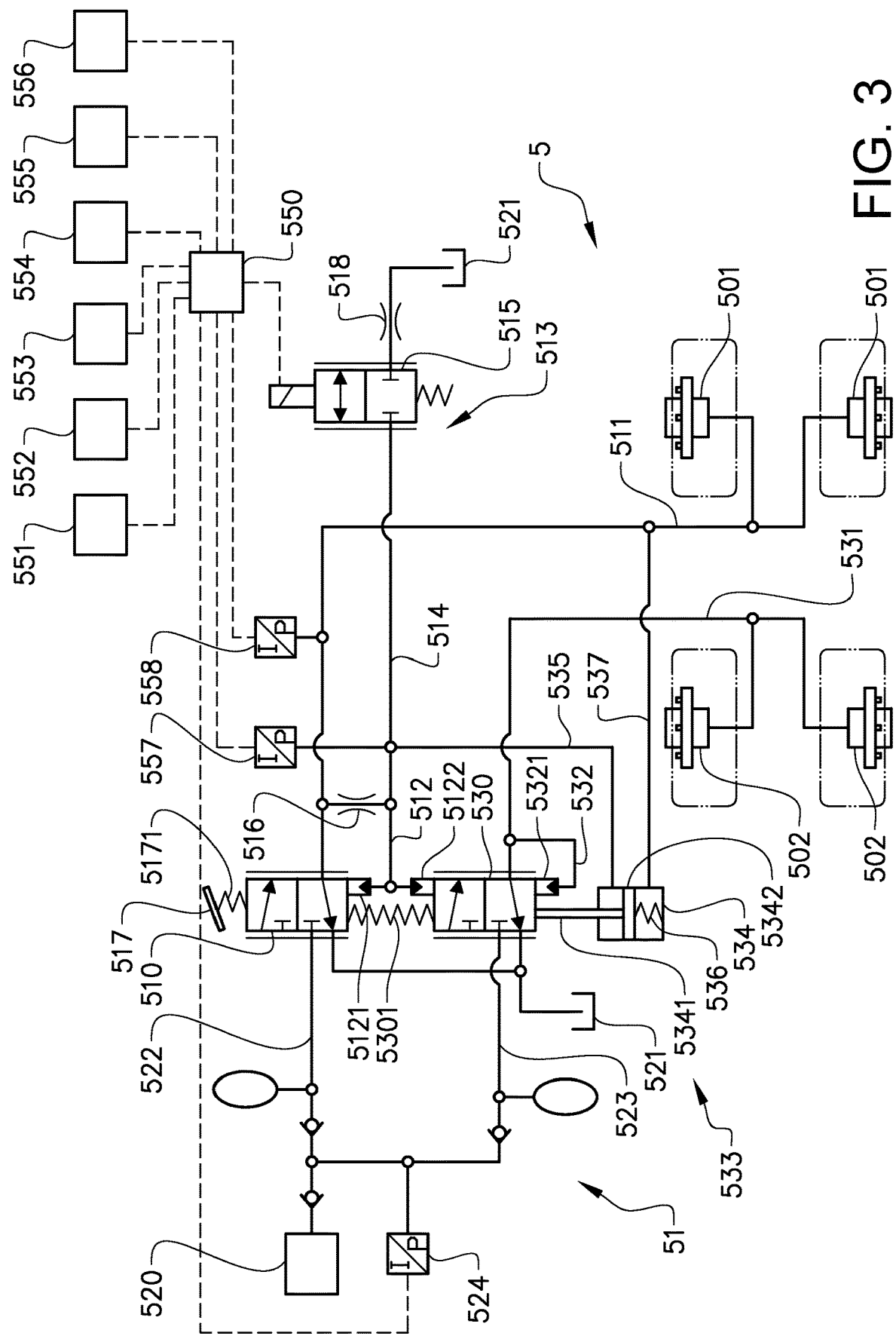
FIG. 3 depicts a brake system of the wheel loader in FIG. 1.

Reference is made to FIG. 3 depicting the brake system 5. The hydraulic control arrangement 51 comprises a hydraulic pressure source 520 including a hydraulic pump. The pressure source is arranged to pressurize a hydraulic fluid of the system. The system is arranged to provide the hydraulic fluid to be pressurized by the hydraulic pressure source 520 from a reservoir 521, e.g. a hydraulic tank. Although the reservoir 521 is represented in FIG. 3 by several symbols, it is understood that it may be embodied as a single tank or a plurality of tanks.

A front brake valve 510 is arranged to communicate with the hydraulic pressure source 520 via a front supply conduit 522. The front brake conduit 511 connects the front brake valve 510 with the front wheel brakes 501. The front brake valve 510 is movable between a closed position, which is upward in FIG. 3, and an open position, which is downwards in FIG. 3. Preferably the front brake valve 510 is a proportional valve which can assume any position between the closed and open positions. Thereby, the front brake valve 510 will gradually provide an increased pressure in the front brake conduit 511 as the valve 510 is moved towards the open position.

A control device 517, in the form of a brake pedal, is arranged to be manipulated by an operator or driver of the working machine 1. The control device 517 is connected via an elastic element 5171, e.g. a spring, with the front brake valve 510 so that when the brake pedal 517 is depressed, the valve 510 moves towards the open position.

The control arrangement 51 further comprises front pilot actuator 5121 arranged to bias the front brake valve 510 towards the closed position. A front brake pilot conduit 512 is arranged to provide a connection or a communication between the front brake conduit 511 and the front pilot actuator 5121. Thereby, the front brake pilot conduit 512 is arranged to be pressurized by the pressure in the front brake conduit 511 so as to bias the front brake valve 510 towards the closed position.

The control arrangement 51 also comprises a pilot conduit control assembly 513 arranged to control the pressure in the front brake pilot conduit 512. The pilot conduit control assembly 513 is arranged to provide a communication between the front brake pilot conduit 512 and the reservoir 521. The communication between the front brake pilot conduit 512 and the reservoir 521 is provided by a pilot conduit draining conduit 514 extending between the front brake pilot conduit 512 and the reservoir 521.

A draining valve 515 is arranged in the pilot conduit draining conduit 514 to control the communication between the front brake pilot conduit 512 and the reservoir 521. Preferably the draining valve 515 is arranged to assume any position between a fully closed position and a fully open position. Said control of the hydraulic control arrangement 51 by the control unit 550 is provided by the control unit 550 being arranged to control the draining valve 515. Thus, the pilot conduit control assembly 513 is arranged to be controlled by the control unit 550.

The control unit 550 is arranged to receive signals from a pilot pressure determining device 557, in the form of a pressure sensor in or at the pilot conduit draining conduit 514, to determine the pressure in the pilot conduit draining conduit 514. The control unit 550 is also arranged to receive signals from a brake pressure determining device 558, in the form of a pressure sensor in or at the front brake conduit 511, to determine the pressure in the front brake conduit 511.

The front brake pilot conduit 512 is provided with a strangulation 516 between the front brake conduit 511 and the pilot conduit draining conduit 514. In this embodiment the strangulation 516 is provided as a narrowed section of the front brake pilot conduit 512. The strangulation 516 is provided between the front brake conduit 511 and a location where the pilot conduit draining conduit 514 branches off from the front brake pilot conduit 512. The strangulation 516 provides for a pressure difference across the strangulation 516. More specifically, if the pressure in the front brake pilot conduit 512 undergoes a transition so as to be decreased due to the draining valve 515 being opened, there will temporarily be a lower pressure on the side of the strangulation 516 on which the pilot draining conduit 514 branches off compared to the pressure in the front brake conduit 511.

A safety strangulation 518 is provided between the draining valve 515 and the reservoir 521. Thereby, if the draining valve should fail so as to be more open than requested, or completely open a corresponding request, the pressure in the front brake pilot conduit 512 may be kept above the pressure in the reservoir 521. As a result, excessive opening of the front brake valve 510 may be avoided. Alternatively the safety strangulation 518 may be provided between the draining valve 515 and pilot pressure determining device 557.

A rear brake valve 530 is arranged to communicate with the hydraulic pressure source 520 via a rear supply conduit 523. The control unit 550 is arranged to receive signals from a supply pressure determining device 524, in the form of a pressure sensor at the hydraulic pressure source 520, to determine the pressures in the front and rear supply conduits 522, 523.

The rear brake conduit 531 connects the rear brake valve 530 with the rear wheel brakes 502. The rear brake valve 530 is movable between a closed position, which is upward in FIG. 3, and an open position, which is downwards in FIG. 3. Preferably the rear brake valve 530 is a proportional valve which can assume any position between the closed and open positions. Thereby, the rear brake valve 530 will gradually provide an increased pressure in the rear brake conduit 531 as the valve 530 is moved towards the open position.

The rear brake valve 530 is connected via an elastic element 5301, e.g. a spring, with the front brake valve 510 so that when the brake pedal 517 is depressed, the displacement is transferred via the front brake valve 510 to the rear brake valve 530 so that the latter moves towards the open position.

The control arrangement 51 further comprises an opening rear pilot actuator 5122 arranged to bias the rear brake valve 530 towards the open position. The front brake pilot conduit 512 is arranged to provide a communication between the front brake conduit 511 and the opening rear pilot actuator 5122. Thereby, when the front brake pilot conduit 512 is pressurized by the pressure in the front brake conduit 511 the opening rear pilot actuator 5122 will bias the rear brake valve 530 towards the open position.

The control arrangement 51 further comprises a closing rear pilot actuator 5321 arranged to bias the rear brake valve 530 towards the closed position. A rear brake pilot conduit 532 is arranged to provide a communication between the rear brake conduit 531 and the closing rear pilot actuator 5321. Thereby, the rear brake pilot conduit 532 is arranged to be pressurized by the pressure in the rear brake conduit 531 so as to bias the rear brake valve 530 towards the closed position.

A rear valve biasing assembly 533 is arranged to bias the rear brake valve 530 towards the closed position in dependence on the control of the pressure in the pilot conduit control assembly 513. The rear valve biasing assembly 533 comprises a biasing hydraulic actuator 534. This may be embodied as a double acting hydraulic cylinder 534. The hydraulic cylinder 534 may be relatively small. The biasing hydraulic actuator 534 presents a piston 5342 and a piston rod 5341 which is connected to the rear brake valve 530.

The biasing hydraulic actuator 534 further comprises an elastic element 536, e.g. in the form of a spring, arranged to bias the rear brake valve 530 towards the closed position. The spring is in this embodiment located on the opposite side of the piston 5342 in relation to the piston rod 5341.

The biasing hydraulic actuator 534 is arranged to communicate with the front brake pilot conduit 512 so as for the pressure in the front brake pilot conduit 512 to bias the rear brake valve 530 towards the open position. The front brake pilot conduit 512 communicates with the piston rod side of the hydraulic cylinder forming the biasing hydraulic actuator 534.

The biasing hydraulic actuator 534 is also arranged to communicate with the front brake conduit 511 so as for the pressure in the front brake conduit 511 to bias the rear brake valve 530 towards the closed position. For this the front brake conduit 511 communicates with the biasing hydraulic actuator 534 on the opposite side of the piston 5342 in relation to the piston rod 5341.

The brake system 5 in FIG. 3 works as follows: Based on method steps described below, the control unit 550 determines a distribution of the brake forces between the front and rear brakes 501, 502. In this embodiment, the control unit 550 determines whether the brake forces are to be distributed equally between the front and rear brakes 501, 502 or whether the front brake force should be higher than the rear wheel brake force. If the front brake force is to be higher than the rear wheel brake force, the control unit determines as detailed below an increase of the front brake force as a percentage or fraction of the front wheel brake force in a case where the brake forces are equally distributed between the front and rear brakes 501, 502. Also, if the front brake force is to be higher than the rear wheel brake force, the control unit determines as detailed below a decrease of the rear brake force as a percentage or fraction of the rear wheel brake force in a case where the brake forces are equally distributed between the front and rear brakes 501, 502.

Upon opening of the front brake valve 510 by depression of the control device 517 with a force, Fop, the pressure, Pfrontpilot, in the front brake pilot conduit 512 acts in the opposite direction, i.e. biasing the front brake valve towards the closed position. Due to the connection to the front brake conduit 511, the front brake pilot conduit pressure Pfrontpilot increases with increased control device 517 depression. When the front brake pilot conduit pressure Pfrontpilot multiplied with an effective area, Afrontpilot, of the front pilot actuator 5121 is equal to the control device depression force Fop, i.e. when Pfrontpilot*Afrontpilot=Fop, the front brake valve 510 will be fixed. The effective area, Afrontpilot, of the front pilot actuator 5121 means an area which when multiplied with the front brake pilot conduit pressure Pfrontpilot provides a value of a resultant force in the direction of movement of the front brake valve 510.

It should be noted that the elastic element 536 of the biasing hydraulic actuator 534, acting on the front brake valve 510 via the rear brake valve 530 and via the elastic element 5301 between the valves 510, 530, gives in this embodiment a negligible contribution to the forces acting on the front brake valve 512.

Since the draining valve 515 is opened, the front brake pilot conduit pressure Pfrontpilot is lower by a percentage compared to the pressure, Pfrontconduit, in the front brake conduit 511, due to the pilot draining conduit 514 connection to the reservoir 521. This percentage of said pressure difference, Pdiff=Pfrontconduit−Pfrontpilot, is determined by the control unit 550 based on the increase of the front brake force determined as detailed below. The control of the draining valve 515 is based partly on feedback from the pilot pressure determining device 557 and the brake pressure determining device 558. It should be noted that the strangulation 516 between the pilot draining conduit 514 and the front brake conduit 511 makes it possible to obtain the pressure difference, Pdiff, without affecting the front brake conduit pressure, Pfrontconduit, to any substantial degree.

It follows from the description above that Pfrontconduit=Fop/Afrontpilot+Pdiff. Thus, it is understood that the brake system 5 provides for raising the pressure in the front brake conduit 511, by the opening of the draining valve 515, without affecting the control device depression force Fop.

The rear brake force is decreased as follows:

When the rear brake valve 530 is in a fixed position, upon the depression of the control device 517, the rear valve biasing assembly 533 will bias the rear brake valve 530 towards the closed position with a force as follows:

$$Fbias = Pfrontconduit*Apiston - Pfrontpilot*Arod + Fspring$$

where Apiston is the effective area of the rear valve biasing assembly 533 on the opposite side of the piston 5342 in relation to the piston rod 5341, Arod is the effective area of the rear valve biasing assembly 533 on the side of the piston 5342 with the piston rod 5341, and Fspring is the force from the rear valve biasing assembly elastic element 536.

In addition, the pressure, Prearpilot, in the rear brake pilot conduit 532 will bias the rear brake valve 530 towards the closed position, with a force equal to Prearpilot*Arearpilot1, where Arearpilot1 is the effective area of the rear pilot actuator 5321. Also, the opening rear pilot actuator 5122 will bias the rear brake valve 530 towards the open position with a force equal to Pfrontpilot*Arearpilot2, where Arearpilot2 is the effective area of the opening rear pilot actuator 5122.

Thus, when the rear brake valve 530 is fixed, the forces acting on it creates an equilibrium as follows:

$$Pfrontpilot*Arearpilot2 = Prearpilot*Arearpilot1 + Fbias$$

Exchanging Fbias by use of the equation above it follows that $$Pfrontpilot*Arearpilot2 = Prearpilot*Arearpilot1 + Pfrontconduit*Apiston - Pfrontpilot*Arod + Fspring$$

Since the rear brake pilot conduit pressure, Prearpilot, is equal to the pressure, Prearconduit, in the rear brake conduit 531, it follows that $$Prearconduit = (Pfrontpilot*Arearpilot2 + Pfrontpilot*Arod - Pfrontconduit*Apiston - Fspring)/Arearpilot1$$

Thus, the pressure, Prearconduit, in the rear brake conduit 531 is reduced, due to the pressure, Pfrontpilot, in the front brake pilot conduit 512 being decreased by the open draining valve 515, and the pressure, Pfrontconduit, in the front brake conduit 511 being increased by the open draining valve 515 as explained above. It should be noted that similarly to the case of the front brake valve 510, the force, Fspring, from the rear valve biasing assembly elastic element 536 gives in this embodiment a negligible contribution to the total forces acting on the rear brake valve 530.

The influence to the reduction of the rear brake conduit pressure, Prearconduit, of the increased front brake conduit pressure, Pfrontconduit, and the decreased front brake pilot conduit pressure, Pfrontpilot, may be controlled by a suitable design of the rear valve biasing assembly 533. More specifically, with an increased effective area Apiston of the rear valve biasing assembly 533 on the opposite side of the piston 5342 in relation to the piston rod 5341, the contribution of the increased front brake conduit pressure, Pfrontconduit, to the reduction of the rear brake conduit pressure, Prearconduit, will increase, and vice versa. Also, with an increased effective area Arod of the rear valve biasing assembly 533 on the side of the piston 5342 with the piston rod 5341, the contribution of the reduction of the front brake pilot conduit pressure, Pfrontpilot, to the reduction of the rear brake conduit pressure, Prearconduit, will increase, and vice versa.

For example, the rear valve biasing assembly 533 may be designed so that a pressure increase in the front brake conduit 510 of 10% will result in a pressure decrease in the rear brake conduit 530 of 10%. In another example, the rear valve biasing assembly 533 is alternatively designed so that a pressure increase in the front brake conduit 510 of 10% will result in a pressure decrease in the rear brake conduit 530 of 20%.

It should also be noted that in some embodiments, the front and rear brakes 501, 502 may be designed to provide different brake forces when subjected to the same pressure, e.g. due to a difference in the sizes of the brakes. In such embodiments, where it is desired to decrease the rear wheel brake force by the same degree as the degree to which the front wheel brake force is increased, by opening the draining valve 515 as described above, the pressure decrease in the rear brake conduit 531 needs to be decreased to a larger degree than the degree to which the pressure in the front brake conduit 511 is increased.

The brake system described above with reference to FIG. 3 provides a robust, safe and cost effective way of controlling the distribution of brake forces between the front and rear wheels. It should be noted that in alternative embodiments, the distribution of brake forces between the front and rear wheels may be controlled in an alternative manner, e.g. by a brake system including a "brake by wire" function. Such a function could include the control unit 550 being arranged to receive signals from the control device 517, and to control electric actuators for the front and rear brake valves 510, 530 based on the brake force distribution determination described below.

Figure 4:
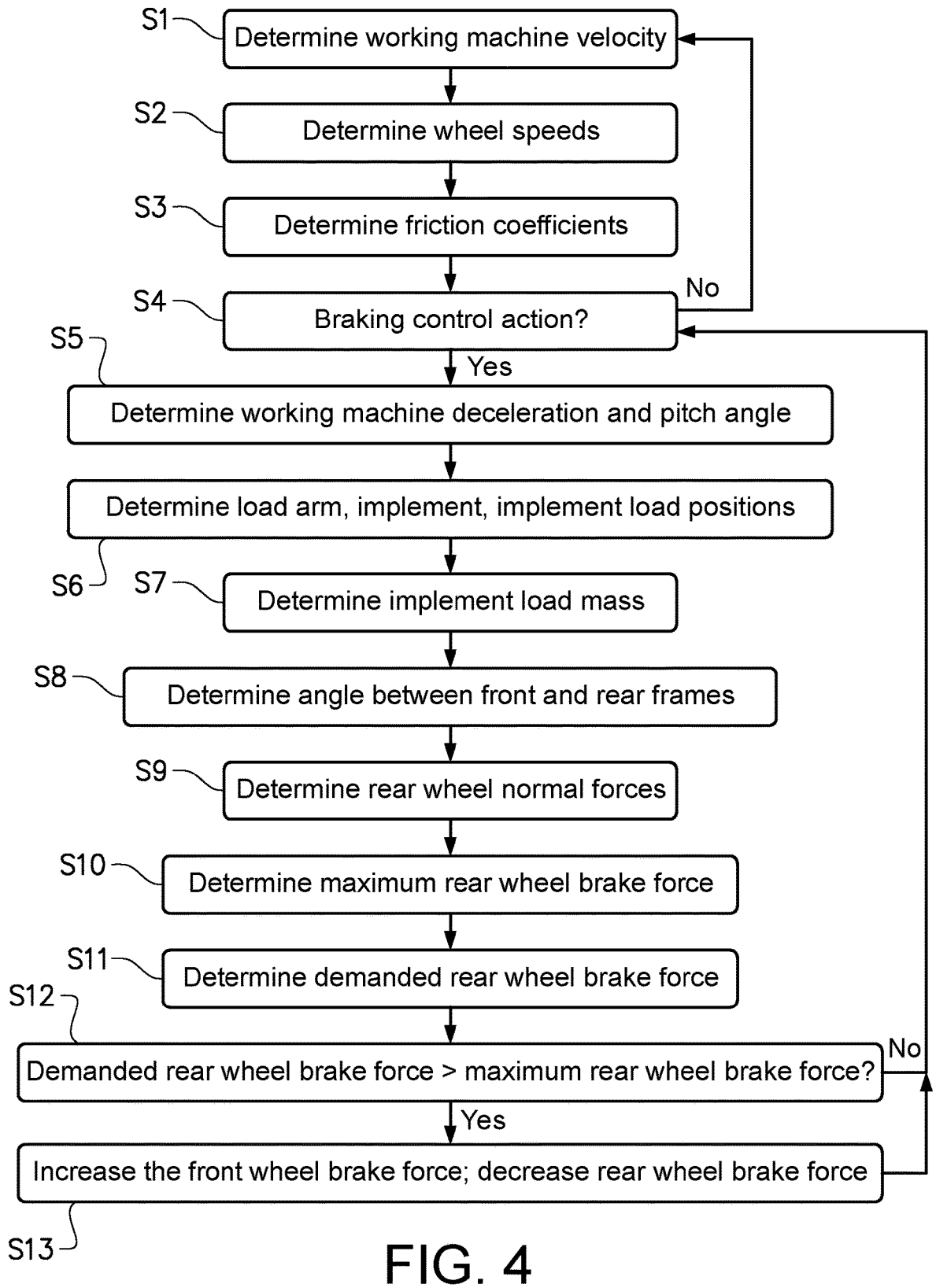
FIG. 4 is a block diagram depicting steps in a method of controlling the brake system in FIG. 3.

With reference to FIG. 4, a method for determining the distribution of brake forces between the front and rear wheel brakes 501, 502 will be described.

The method comprises determining a friction coefficient between each of the front and rear wheels 106, 107 and the element SE supporting the working machine 1. The friction coefficient may vary e.g. depending of the nature of the supporting element SE, e.g. whether it is gravel, sand, clay or asphalt. The friction coefficient may also vary e.g. depending of tires of the wheels 106, 107, e.g. their quality or degree of wear.

In this embodiment, the friction coefficient is calculated as follows. The calculation is made for a single wheel and repeated for all wheels for which the friction coefficient is to be established.

The working machine velocity (Vwm) is determined 51 using the wheel speed sensors 552 of all four wheels 106, 107 or the movement detection device 554. In some embodiments, the working machine velocity may be determined using the wheel speed sensors 552 of all four wheels 106, 107 as well as the movement detection device 554.

The working machine velocity (Vwm) may be the velocity of the working machine in a direction of straight travel of the working machine 1. However, it is also possible to determine the working machine velocity while the working machine is turning, e.g. by use of the frame positioning device 555 for determining the angle between the front and rear frames 102, 103. In alternative embodiments, the working machine velocity (Vwm) may be determined with a device using the Global Positioning System (GPS).

The rotational velocity ($\Omega w$) of the wheel 106, 107 for which the friction coefficient is to be established is determined S2 using the wheel speed sensor 552 of that wheel. The distance between the wheel rotational axis 108, 109 and the area of contact of the wheel with the supporting element SE is herein referred to as a rolling radius (R). A virtual longitudinal velocity (Vwh) of the wheel for which the friction coefficient is to be established is determined as the wheel rotational velocity ($\Omega w$) multiplied by the rolling radius (R), i.e. Vwh=$\Omega w$*R.

A slip velocity (Vs) is calculated as an absolute value of the difference between wheel virtual longitudinal velocity (Vwh) and the working machine velocity (Wwm), i.e. Vs=abs(Vwh−Vwm). A slip (S) is determined as the slip velocity (Vs) divided by the working machine velocity (Wwm), i.e. S=Vs/Vwm.

The torque (TQw) applied by the hub motor 1104 at the wheel is determined. A tracking force (Fw) of the wheel is calculated as the motor torque (TQw) multiplied by the rolling radius (R), i.e. Fw=TQw*R. An ideal traction force Fwideal is calculated as the tracking force (Fw) multiplied by the minimum of 1 and 1−S, (S being the slip determined as described above), i.e. Fwideal=Fw*min(1,(1−S)).

The normal force (Nw) of the wheel is determined, e.g. by a moment calculation similar to the one used in the later method step S9 described below. The friction coefficient (Mu) is determined S3 as the ideal friction force (Fwideal) divided by the normal force (Nw), i.e. Mu=Fwideal/Nw.

The determined friction coefficients of the wheels 106, 107 are stored in the storage device 559 accessible to the control unit 550. The friction coefficients of the wheels are determined in said manner repeatedly during operation of the working machine 1, and the stored values of the friction coefficients are updated at the same pace.

In alternative embodiments, the friction coefficient between each of the front rear wheels 106, 107 and the element SE supporting the working machine 1 may be predetermined and assumed to not change during the operation of the vehicle.

The control unit 550 continuously monitors S4 whether there is a braking control action by the driver of the working machine 1. Where the driver depresses the control device 517 (FIG. 3), this braking control action is detected by the control unit 550 by a detection of an increased pressure in the front brake conduit 511 by means of the brake pressure determining device 558. If no braking control action is detected the friction determining steps S1-S3 are repeated.

If a braking control action is detected the control unit 550 then determines S5 the retardation or deceleration and the pitch angle of the working machine 1 by means of the movement detection device 554.

The masses and positions of the front and rear frames 102, 103 of the wheel loader frame 101 are predetermined and stored in the storage device 559. Also the masses of the load arm 6 and the implement 14 are predetermined and stored in the storage device 559.

By means of the angular sensor 551 for determining the angle between the load arm 6 and the front frame 102, the positions of the load arm 6, the implement 14 and the load carried by the implement are determined S6. This includes determining a height of the implement 14. For the positions of the implement 14 and the load carried by the implement the tilt positioning means 556 is also used. The mass of the load carried by the implement 14 is determined S7 by the input from the angular sensor 551 and the load sensor 553 at the main hydraulic cylinder 8.

In addition, the angle between the front and rear frames 102, 103 are determined S8 by means of the frame positioning device 555.

Thereupon the normal forces acting on the rear wheels 107 are determined S9. This is done by a moment calculation with reference to the front wheel axis 108.

Figure 5:
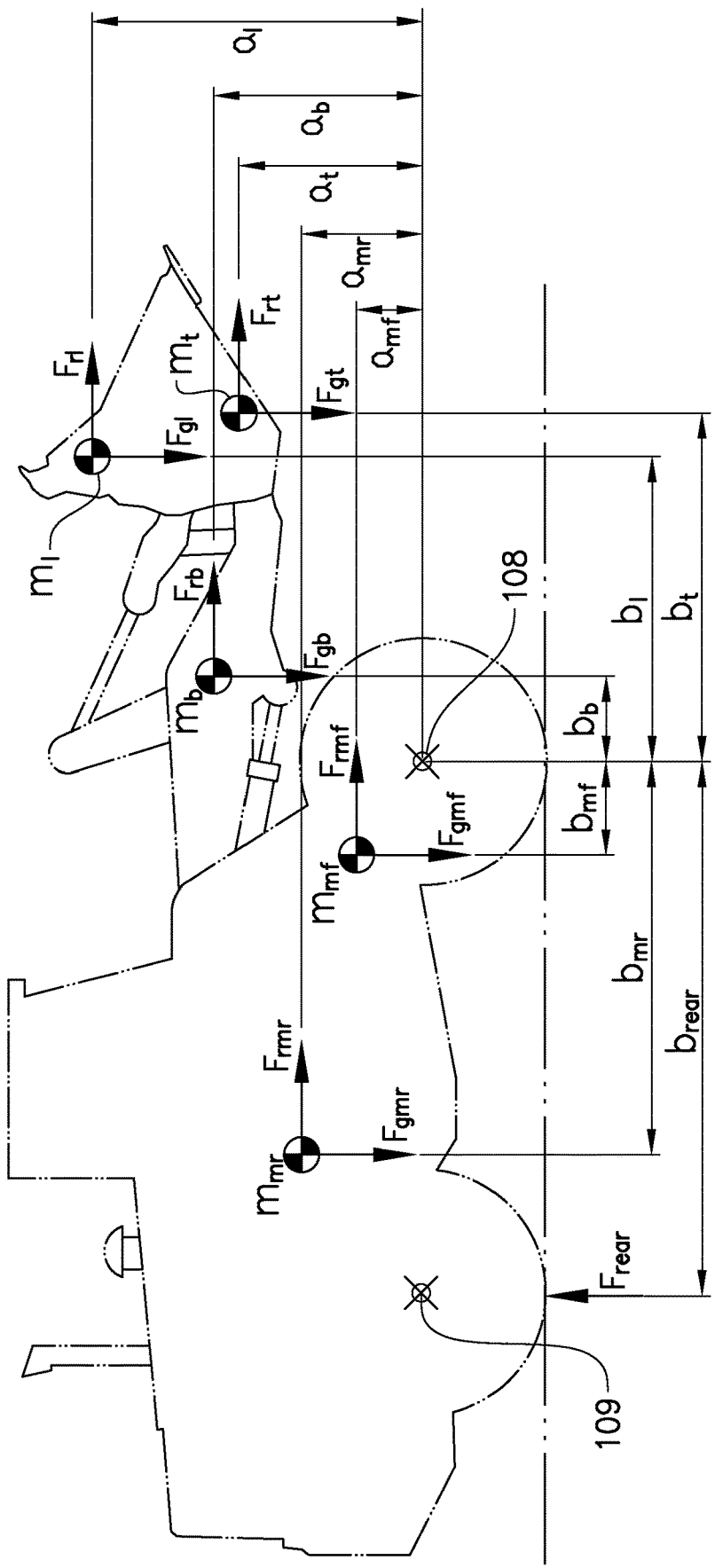
FIG. 5 is a side view of the wheel loader in FIG. 1, depicting parameters used in the method depicted in FIG. 4.

Reference is made also to FIG. 5. Moment contributions from gravity forces Fgmr, Fgmf, Fgb, Fgt, Fgl are determined based on the pitch angle of the working machine 1, and the masses and horizontal moment arms of the rear frame mmr, bmr, the front frame mmf, bmf, the load arm mb, bb, the implement mt, bt and the load carried by the implement ml, bl. The gravity forces are vertical and the moment arms for said gravity force moment contributions are horizontal. Said moment arms are adjusted taking the angle between the front and rear frames 102, 103, as determined by the frame positioning device 555, into account.

Moment contributions from retardation forces Frmr, Frmf, Frb, Frt, Frl caused by inertia during braking, are determined based on the determined deceleration, the pitch angle of the working machine 1, and the masses and moment arms of the rear frame mmr, amr, the front frame mmf, amf, the load arm mb, ab, the implement mt, at and the load carried by the implement ml, al. The retardation forces are assumed to be parallel with the direction of travel of the working machine. This means that if the working machine is travelling downhill, the retardation forces will have a non-zero angle to a horizontal plane. The moment arms for the retardation force moment contributions are perpendicular to the direction of travel of the working machine.

Thus, when the moment contributions from gravity and retardation forces are determined, the normal forces Frear acting on the rear wheels 107 are determined S9 by the moment calculation with reference to the front wheel axis 108. For this the moment arm, brear, i.e. the distance between the front and rear wheel axes 108, 109 are determined. This distance, brear, may be adjusted taking the angle between the front and rear frames 102, 103 into account.

Thereafter, the control unit 550 determines S10 a maximum rear wheel brake force based on the determined friction coefficient of the rear wheels 107 and normal forces Frear acting on the rear wheels 107. Relatively low normal forces Frear acting on the rear wheels 107, e.g. due to a high position of the load in the implement 14, will be followed by a relatively low maximum rear wheel brake force. The maximum rear wheel brake force is determined such that locking or skidding of the rear wheels 107 is avoided.

Also, a demanded rear wheel brake force is determined S11, which is determined by means of the brake pressure determining device 558 in the front brake conduit 511 and the pilot pressure determining device 557 in the pilot conduit draining conduit 514. Thereafter it is determined S12 whether the demanded rear wheel brake force is higher than the maximum rear wheel brake force. If the demanded rear wheel brake force is higher than the maximum rear wheel brake force, it is determined S13 to increase the front wheel brake force by a difference between the determined demanded rear wheel brake force and the determined maximum rear wheel brake force. Also, it is determined to decrease the rear wheel brake force by the difference between the determined demanded rear wheel brake force and the determined maximum rear wheel brake force.

The determined increase of the front wheel brake force and the determined decrease of the rear wheel brake force are effectuated by control of the draining valve 515 of the pilot conduit control assembly 513, as described above with reference to FIG. 3.

If it is determined S12 that the demanded rear wheel brake force is not higher than the maximum rear wheel brake force, the step of determining S4 whether there is a braking control action is repeated.

It should be noted that the normal forces acting on the front wheels 106 may be calculated e.g. from the equilibrium of forces in the vertical direction and the known gravity forces and the normal forces Frear acting on the rear wheels 107. This may be useful in embodiments where the front wheel normal forces are taken into account, e.g. as exemplified above.

Figure 6:
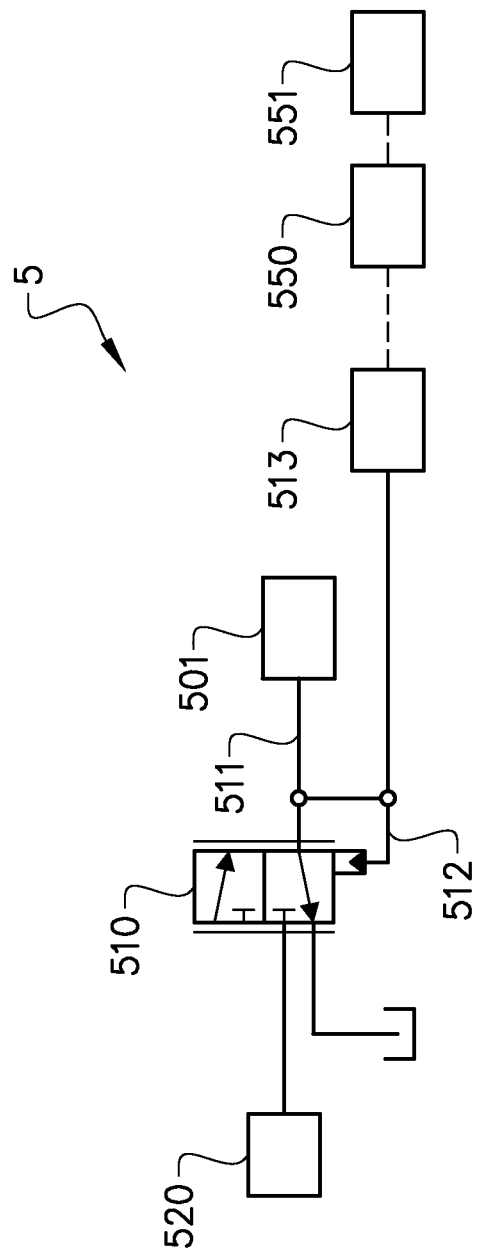
FIG. 6 depicts a brake system according to an alternative embodiment.

Reference is made to FIG. 6 depicting a brake system 5 for a working machine according to an alternative embodiment of the invention. The brake system 5 comprises a front wheel brake 501 arranged to brake one of two front wheels 106 of the working machine, and a hydraulic pressure source 520 arranged to pressurize a hydraulic fluid of the system. The system further comprises a front brake valve 510, movable between a closed position and an open position and arranged to communicate with the hydraulic pressure source 520. Also, a front brake conduit 511 connects the front brake valve 510 with the front wheel brake 501. The system further comprises a front brake pilot conduit 512 arranged to communicate with the front brake conduit 511 and to be pressurized so as to bias the front brake valve 510 towards the closed position.

A pilot conduit control assembly 513 is arranged to control the pressure in the front brake pilot conduit 512. A control unit 550 is arranged to receive signals from an implement positioning means 551 arranged to determine a position of an implement of the working machine in relation to a frame of the working machine.

Figure 7:
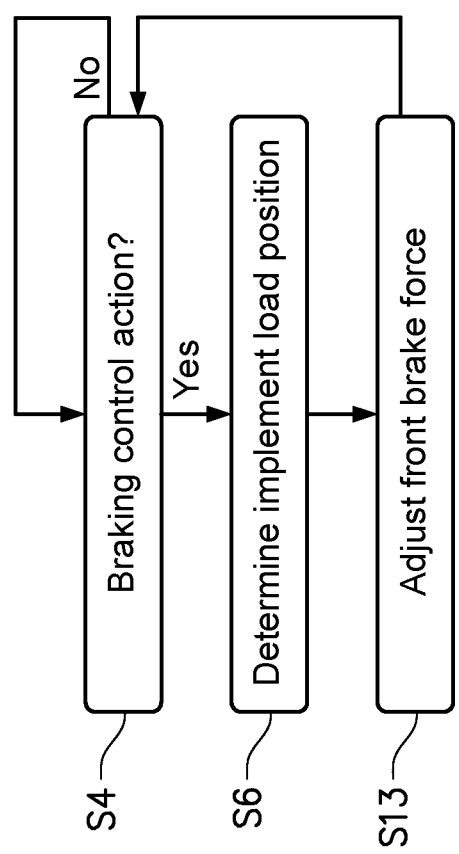
FIG. 7 is a block diagram depicting steps in a method of controlling the brake system in FIG. 6.

Reference is made to FIG. 7. In a method of controlling the brake system in FIG. 6, it is determined S4 whether there is a braking control action so as to adjust the front brake valve 510. If there is such a control action, the positon of the implement is determined S6 by means of the implement positioning means 551. Based on the determined position of the implement, the front brake force is adjusted S13 by control of the pilot conduit control assembly 513.

It is to be understood that the present invention is not limited to the embodiments described above and illustrated in the drawings; rather, the skilled person will recognize that many changes and modifications may be made within the scope of the appended claims.

The invention claimed is:

1. A method for controlling brake forces of a working machine, the working machine comprising a frame and two front wheels and two rear wheels mounted to the frame, the working machine further comprising a front wheel brake arranged to brake at least one of the front wheels and a rear wheel brake arranged to brake at least one of the rear wheels, the front wheel brake being controllable independently of the rear wheel brake, and vice versa, the working machine further comprising an implement connected to the frame so as to be movable in relation to the frame, the method comprising determining a position of the implement in relation to the frame, determining a friction coefficient between the rear wheels and an element supporting the working machine, determining a normal force acting on the rear wheels, determining a maximum rear wheel brake force based at least partly on the determined friction coefficient and normal force, and distributing, during braking of the working machine, the brake forces between the front and rear wheel brakes at least partly based on the determined implement position and the determined maximum rear wheel brake force.

2. A method according to claim 1, wherein determining the position of the implement comprises determining the height of the implement in relation to the frame.

3. A method according to claim 1, wherein determining the position of the implement comprises determining the location of the implement in relation to the frame in a longitudinal direction of the working machine.

4. A method according to claim 1, where the implement is connected to the frame via a load arm which is pivotably connected to the frame, wherein determining the position of the implement comprises determining an angle of the load arm in relation to the frame.

5. A method according to claim 1, where the implement is connected to the frame via a load arm, the method further comprising determining a position of the load arm in relation to the frame, and distributing the brake forces between the front and rear wheel brakes partly based on the determined load arm position.

6. A method according to claim 1, further comprising determining a load of the implement, and distributing the brake forces between the front and rear wheel brakes partly based on the determined load of the implement.

7. A method according to claim 1, further comprising determining a velocity of the working machine, and determining a rotational velocity of at least one of the rear wheels, wherein determining the friction coefficient comprises determining the friction coefficient based at least partly on the determined working machine velocity and the determined rear wheel rotational velocity.

8. A method according to claim 1, further comprising determining a demanded rear wheel brake force, wherein distributing the brake forces between the front and rear wheel brakes comprises increasing the front wheel brake force if the determined demanded rear wheel brake force is higher than the determined maximum rear wheel brake force.

9. A method according to claim 8, further comprising determining a difference between the determined demanded rear wheel brake force and the determined maximum rear wheel brake force, wherein increasing the front wheel brake force comprises increasing the front wheel brake force by the difference between the determined demanded rear wheel brake force and the determined maximum rear wheel brake force.

10. A method according to claim 1, further comprising determining a friction coefficient between the front wheels and an element supporting the working machine, determining a normal force acting on the front wheels, and distributing the brake forces between the front and rear wheel brakes based partly on the determined friction coefficient and normal force.

11. A method according to claim 1, further comprising determining a normal force acting on the front wheels, determining a normal force acting on the rear wheels, and controlling the brake force distribution between the front and rear wheel brakes so as to obtain the same ratio of the respective brake force and the respective normal force on the front and rear wheels.

12. A method according to claim 1, where the frame of the working machine comprises a rear frame to which the rear wheels are mounted and a front frame to which the front wheels are mounted, the front and rear frames being pivotably connected to each other to provide an articulated steering capacity to the working machine, the method further comprising determining an angle between the front and rear frames, and distributing the brake forces between the front and rear wheel brakes based partly on said determined angle.

13. A method according to claim 1, further comprising determining an acceleration, a pitching angle and/or a pitching velocity of the working machine, and distributing the brake forces between the front and rear wheel brakes partly based on the determined acceleration, pitching angle and/or a pitching velocity of the working machine.

14. A method according to claim 1, where the frame of the working machine comprises a rear frame to which the rear wheels are mounted and a front frame to which the front wheels are mounted, the front and rear frames being pivotably connected to each other to provide an articulated steering capacity to the working machine, the method further comprising determining an acceleration, a pitching angle and/or a pitching velocity of the rear frame, and distributing the brake forces between the front and rear wheel brakes partly based on the determined acceleration, pitching angle and/or a pitching velocity of the rear frame.

15. A computer readable medium carrying a computer program comprising non-transitory program code means for performing the steps of claim 1 when said program product is run on a computer.

16. A control unit configured to control brake forces of a working machine, the working machine comprising a frame and two front wheels and two rear wheels mounted to the frame, the working machine further comprising a front wheel brake arranged to brake at least one of the front wheels, and a rear wheel brake arranged to brake at least one of the rear wheels, the front wheel brake being controllable independently of the rear wheel brake, and vice versa, the working machine further comprising an implement connected to the frame so as to be movable in relation to the frame, wherein the control unit is arranged to determine a position of the implement in relation to the frame, determine a friction coefficient between the rear wheels and an element supporting the working machine, determine a normal force acting on the rear wheels, determine a maximum rear wheel brake force based at least partly on the determined friction coefficient and normal force, and to calculate a distribution, during braking of the working machine, of the brake forces between the front and rear wheel brakes at least partly based on the determined implement position and the determined maximum rear wheel brake force.

17. A brake system for a working machine, comprising two front wheel brakes and two rear wheel brakes, the front wheel brakes being controllable independently of the rear wheel brakes, and vice versa, wherein the brake system further comprises implement positioning means for determining a position of an implement of the working machine in relation to a frame of the working machine, the brake system further comprising a control unit according to claim 16.

18. A working machine comprising a control unit according to claim 16.

19. A working machine according to claim 18, wherein it comprises a propulsion system arranged to provide a torque to at least one of the rear wheels and a torque to at least one of the front wheels, wherein the rear wheel torque can be controlled independently of the front wheel torque and vice versa.

20. A working machine according to claim 19, wherein the propulsion system comprises a hub motor at the at least one of the rear wheels and a hub motor at the at least one of the front wheels.

21. A working machine according to claim 18, wherein the working machine further comprises a frame and an implement connected to the frame via a load arm which is pivotably connected to the frame, whereby the load arm is arranged to pivot around an axis which is substantially horizontal when the working machine is supported by a horizontal supporting element.

22. A working machine according to claim 18, wherein the working machine further comprises a frame and an implement connected to the frame via a load arm which is pivotably connected to the frame, whereby the implement is pivotably connected to the load arm.

* * * * *